(12) United States Patent
Friedel et al.

(10) Patent No.: US 8,741,038 B2
(45) Date of Patent: Jun. 3, 2014

(54) FLUORINE-FREE COMPOSITION FOR WATER REPELLENT COATING OF SURFACES WITH IMPROVED WATER REPELLENT PROPERTIES

(75) Inventors: Manuel Friedel, Zurich (CH); Spomenko Ljesic, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 426 days.

(21) Appl. No.: 13/147,712

(22) PCT Filed: Jan. 11, 2010

(86) PCT No.: PCT/EP2010/050207
§ 371 (c)(1),
(2), (4) Date: Sep. 2, 2011

(87) PCT Pub. No.: WO2010/089166
PCT Pub. Date: Aug. 12, 2010

(65) Prior Publication Data
US 2011/0308423 A1    Dec. 22, 2011

(30) Foreign Application Priority Data
Feb. 4, 2009   (DE) .......................... 10 2009 000 614

(51) Int. Cl.
*C04B 41/49* (2006.01)
*C09D 183/04* (2006.01)
*C04B 41/00* (2006.01)

(52) U.S. Cl.
CPC ........... *C04B 41/009* (2013.01); *C04B 41/4922* (2013.01); *C04B 41/4961* (2013.01); *C09D 183/04* (2013.01)
USPC .................... 106/2; 106/287.13; 106/287.14; 106/287.15; 106/287.16

(58) Field of Classification Search
USPC .......... 106/2, 287.13, 287.14, 287.15, 287.16
See application file for complete search history.

(56) References Cited

U.S. PATENT DOCUMENTS

| | | | |
|---|---|---|---|
| 5,037,873 A | 8/1991 | Heaton | |
| 6,139,622 A | 10/2000 | Göbel et al. | |
| 6,635,735 B1 | 10/2003 | Zhang et al. | |
| 6,641,870 B2 | 11/2003 | Bartkowiak et al. | |
| 6,685,766 B2 | 2/2004 | Standke et al. | |
| 7,078,460 B2 * | 7/2006 | Ikeno et al. | 524/588 |
| 7,427,442 B2 | 9/2008 | Albert et al. | |
| 7,781,520 B2 | 8/2010 | Standke et al. | |
| 8,039,110 B2 | 10/2011 | Jenkner et al. | |
| 8,101,682 B2 | 1/2012 | Standke | |
| 8,147,918 B2 | 4/2012 | Standke et al. | |
| 8,188,266 B2 | 5/2012 | Edelmann et al. | |
| 8,298,679 B2 | 10/2012 | Albert et al. | |
| 8,481,654 B2 | 7/2013 | Edelmann et al. | |
| 2002/0086907 A1 | 7/2002 | Standke et al. | |
| 2006/0235143 A1 * | 10/2006 | Muller et al. | 524/588 |
| 2007/0054056 A1 | 3/2007 | Albert et al. | |
| 2007/0110912 A1 | 5/2007 | Standke | |
| 2008/0187673 A1 | 8/2008 | Standke et al. | |
| 2008/0188617 A1 | 8/2008 | Standke et al. | |
| 2008/0206572 A1 | 8/2008 | Edelmann et al. | |
| 2008/0268233 A1 | 10/2008 | Lawin et al. | |
| 2009/0005518 A1 | 1/2009 | Just et al. | |
| 2009/0007818 A1 | 1/2009 | Militz et al. | |
| 2009/0064894 A1 * | 3/2009 | Baumgart et al. | 106/18.32 |
| 2010/0119851 A1 | 5/2010 | Giessler-Blank et al. | |
| 2010/0159144 A1 | 6/2010 | Standke et al. | |
| 2010/0209719 A1 | 8/2010 | Borup et al. | |
| 2011/0124794 A1 | 5/2011 | Friedel et al. | |
| 2011/0259240 A1 | 10/2011 | Jenkner et al. | |
| 2012/0031302 A1 | 2/2012 | Albert et al. | |
| 2012/0204762 A1 | 8/2012 | Albert et al. | |

FOREIGN PATENT DOCUMENTS

| | | |
|---|---|---|
| DE | 10 2005 004 871 | 8/2006 |
| EP | 0 412 516 | 2/1991 |
| EP | 1 205 505 | 5/2002 |
| JP | 2002265785 A * | 9/2002 |
| JP | 2008 291225 | 12/2008 |

OTHER PUBLICATIONS

U.S. Appl. No. 13/580,194, filed Aug. 21, 2012, Borup, et al.
U.S. Appl. No. 13/638,702, filed Oct. 25, 2012, Friedel, et al.
U.S. Appl. No. 13/638,733, filed Oct. 1, 2012, Friedel, et al.
U.S. Appl. No. 13/638,734, filed Oct. 1, 2012, Friedel, et al.
U.S. Appl. No. 13/640,638, filed Oct. 11, 2012, Friedel, et al.
U.S. Appl. No. 13/638,619, filed Oct. 1, 2012, Friedel, et al.
U.S. Appl. No. 13/989,205, filed May 23, 2013, Friedel, et al.
International Search Report issued Mar. 24, 2010 in PCT/EP10/50207 filed Jan. 11, 2010.
U.S. Appl. No. 13/062,225, filed Mar. 4, 2011, Weissenbach, et al.
U.S. Appl. No. 14/111,185, filed Oct. 11, 2013, Friedel, et al.
U.S. Appl. No. 14/110,840, filed Oct. 9, 2013, Friedel, et al.

* cited by examiner

*Primary Examiner* — Anthony J Green
(74) *Attorney, Agent, or Firm* — Oblon, Spivak, McClelland, Maier & Neustadt, L.L.P.

(57) ABSTRACT

The present invention relates to a fluorine-free composition for hydrophobizing porous mineral substrates and for producing a water repellent effect on the surface of the substrate, the composition being based on
  at least one hydrophobizing active substance and
  at least one hydrophobic metal oxide.
The invention furthermore relates to a process for the preparation of such a composition and the use of this composition.

16 Claims, No Drawings

FLUORINE-FREE COMPOSITION FOR WATER REPELLENT COATING OF SURFACES WITH IMPROVED WATER REPELLENT PROPERTIES

The present invention relates to a composition based on alkylalkoxysilanes and/or alkylalkoxysiloxanes for hydrophobizing porous mineral substrates and for providing porous mineral substrates with water repellent properties, the preparation thereof and the use thereof for protecting buildings. Alkylalkoxysilanes and alkylalkoxysiloxanes are also designated below for short as hydrophobizing active substance or as silane systems, oligomeric silane systems or silane oligomers.

It has long been known that silane compounds carrying alkyl chains can produce hydrophobizing properties on porous mineral substances. Thus, in particular monomeric, relatively short-chain alkylalkoxysilanes are distinguished by good deep impregnation (EP 0 101 816).

Oligomeric silane systems, such as alkylalkoxysiloxanes, have advantages with regard to their use as water repellents since they release less volatile organic compounds (VOC) than monomeric silane systems during use.

Furthermore, it is known that building protection compositions can be used in the form of a solution or of a liquid or pasty or creamy, i.e. high-viscosity, emulsion (inter alia EP 0 814 110, EP 1 205 481, EP 1 205 505, WO 06/081891).

A quality feature of hydrophobizations which is frequently desired by users is the repulsion of water drops on the surface of a hydrophobized substrate (referred to as water repellent effect for short). Such water repellent effects can additionally help to reduce the growth of microorganisms, such as algae, mosses or fungi.

Unfortunately, abovementioned building protection compositions, after application to a porous mineral substrate, prevent the penetration of water (hydrophobization) but in general no water repellent properties or only very weak water repellent properties are achieved.

U.S. Pat. Nos. 4,846,886, 5,674,967, JP 2006-335969 and EP 0 826 650 disclose in each case silane- or siloxane-containing formulations which can produce such water repellent effects on porous, mineral surfaces. However, sufficiently pronounced water repellent effects are achieved only by the use of fluorine-containing compounds. Fluorinated organic compounds are expensive and there is increased ecological interest in replacing them (J. M. Conder et al. *Environmental Science Technology*, 2008, 42(4), 995-1003. K. S. Kumar *Research Journal of Chemistry and Environment*, 2005, 9(3), 50-79.).

Furthermore, it is known from the literature that pronounced water repellent effects can be achieved by the use of silicic acids or more generally by the use of oxidic nanoparticles for the surface modification. Corresponding coatings are described, for example, in JP 2002-338943 or WO 2008/106494.

JP 2008-031275 describes aqueous emulsions of silane systems to which hydrophilic metal oxides are added in order to improve the water repellent behaviour. The disadvantage in the use of such hydrophilic metal oxides is that the water repellency of a surface can be adversely affected by the hydrophilicity introduced.

The preparation and properties of hydrophobic metal oxides and in particular silicic acids are described, for example, in JP 2007-161510, DE 10 2004 010 756 or DE 10 2004 055 585.

It was the object of the present invention to provide a fluorine-free formulation with which porous mineral surfaces or substrates can be treated to impart water repellency and can be provided with an improved water repellent effect. Thus, both the reduction of the water absorption of hydrophobizing active substances is to be retained and the water repellent effect ("Teflon effect") otherwise achievable in particular by fluorine groups is to be achieved.

The object is achieved, according to the invention, according to the statements in the patent claims.

Surprisingly, it has now been found that the desired properties are achieved by introducing a hydrophobic or hydrophobized silica into a hydrophobizing active substance. The measure is surprisingly simple, economical and nevertheless effective, excellent hydrophobizing and at the same time outstanding water repellent effect substantially improved compared with other fluorine-free hydrophobizing systems being achievable in an advantageous manner on application of a composition according to the invention, which is based on at least one hydrophobizing active substance and at least one hydrophobized metal oxide introduced therein, to a porous mineral surface or substrate. In addition, water repellent effects which are at least equivalent to or even surpass the quality of known fluorine-containing treatment systems are achieved by the teaching according to the invention.

In the context of the present application, hydrophobizing active substances or hydrophobizing reagents are substances which, on application to a mineral substrate, produce hydrophobizing of the substrate or hydrophobizing on the surfaces thereof.

The present invention therefore relates to a fluorine-free composition for hydrophobizing porous mineral substrates and for producing a water repellent effect on the surface of the substrate, the composition being based on
 at least one hydrophobizing active substance and
 at least one hydrophobic metal oxide.

As further constituents, a composition according to the invention may contain
 optionally at least one hydrolysis or condensation catalyst,
 optionally at least one organic solvent,
 optionally water,
 optionally at least one emulsifier and/or
 optionally further auxiliaries.

A composition according to the invention is preferably a solvent-free composition.

A composition according to the invention may advantageously contain, as a hydrophobizing active substance, one or more alkyl-substituted silanes of the general formula I

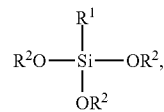

in which $R^1$ represents a $C_1$-$C_{18}$-alkyl group, groups $R^2$ are identical or different and $R^2$ represents a hydrogen atom or an alkyl radical having 1 to 6 carbon atoms, preferably methyl or ethyl. Preferred examples are those having radicals:
$R^1$=$CH_3$—, $C_2H_5$—, $C_3H_7$—, $C_4H_9$—, i-$C_4H_9$—, $C_6H_{13}$—, i-$C_6H_{13}$, $C_8H_{16}$—, i-$C_8H_{16}$—, and
$R^2$=H, methyl or ethyl.

A hydrophobizing active substance can moreover be selected from the series consisting of linear, cyclic or branched oligomeric siloxanes, in particular branched, linear or cyclic alkylalkoxysiloxanes of the general, idealized formula II

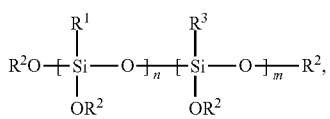

in which groups $R^1$ and $R^3$, independently of one another, are $C_1$-$C_{18}$-alkyl groups which may contain substituents having one or more heteroatoms from the series consisting of N, O, Cl, P and S, groups $R^2$ are identical or different and $R^2$ is a hydrogen atom or an alkyl radical having 1 to 6 carbon atoms, preferably having 1 or 2 carbon atoms, i.e. methyl or ethyl, and (n+m) represents the degree of oligomerization with a numerical value of 2 to 50, preferably 2 to 30, in particular preferably 3 to 20, in particular 3 to 15. These are advantageously oligomer mixtures having an average degree of oligomerization of 2 to 50 (including all numbers in between), preferably of 2 to 30, the average molar mass preferably being 300 to 10 000 g/mol (including all numbers in between). The silane oligomers of the general formula II may be present as linear, cyclic and/or branched units. The determination of the molar mass or average molar mass of said oligomers can be effected, for example, by means of GPC analysis.

The preparation of silane oligomers of the formula II can advantageously be effected according to EP 0 814 110, EP 1 205 481, EP 1 205 505. The abovementioned documents are therefore part of the present description in their entirety.

Preferred examples of silane oligomers are those having radicals:
$R^1$=$CH_3$—, $C_2H_5$—, $C_3H_7$—, $C_4H_9$—, i-$C_4H_9$—, $C_6H_{13}$—, i-$C_6H_{13}$, $C_8H_{16}$—, i-$C_8H_{16}$— and
$R^2$=H, methyl or ethyl
$R^3$=$CH_3$—, $C_2H_5$—, $C_3H_7$—, $C_4H_9$—, i-$C_4H_9$—, $C_6H_{13}$—, i-$C_6H_{13}$, $C_8H_{16}$—, i-$C_8H_{16}$—, $NH_2$—$C_3H_6$—, $NH_2$—$C_2H_4$—NH—$C_3H_6$—, $NH_2$—$C_2H_4$—NH—$C_2H_4$—NH—$C_3H_6$,

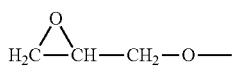

Finally, a hydrophobizing active substance can be selected from the series consisting of the alkyl silicates of the general, idealized formula III

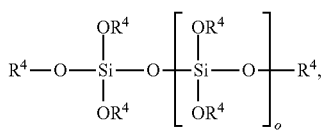

in which $R^4$, independently of one another, represents a hydrogen atom or an alkyl radical having 1 to 6 carbon atoms, preferably having 1 or 2 carbon atoms, i.e. methyl or ethyl, and o is a number from 0 to 50 (including all numbers in between), preferably from 1 to 10.

In addition, mixtures of abovementioned hydrophobizing active substances of the general formulae I, II and III can be used. Each of the hydrophobizing active substances I, II and III, independently of one another, may account for from 0 to 100% (including all numbers in between) of the total amount of hydrophobizing active substance.

The composition according to the invention contains one or more hydrophobic metal oxides. In the context of the present invention, metal oxides may be oxides, hydroxides or hydrated oxides of the elements aluminium, silicon and titanium. Silicas, such as flame silicas, precipitated silicas, crystalline silicas or zeolites, are preferably used. Hydrophobic metal oxides used according to the invention are in particular pulverulent solids; use in liquid form, for example as a sol, such as silica sol, is excluded. Suitable hydrophobic metal oxides can be obtained, for example, if said metal oxides are treated with a hydrophobizing reagent. The treatment can be effected, for example, by wetting (mixing, kneading, milling, immersion, flooding) of said metal oxides with the hydrophobizing reagent and a subsequent thermal aftertreatment, for example in a drying oven. However, the treatment can also be carried out by spraying the metal oxides with a hydrophobizing reagent, optionally under the influence of a relatively high temperature and optionally in the vapour form. Milling and/or classification of the powders can also be carried out beforehand or subsequently. For example, alkylalkoxysilanes, such as methyltrimethoxysilane, ethyltrimethoxysilane, propyltrimethoxysilane, butyltrimethoxysilane, octyltrimethoxysilane, hexadecyltrimethoxysilane, methyltriethoxysilane, ethyltriethoxysilane, propyltriethoxysilane, butyltriethoxysilane, octyltriethoxysilane, hexadecyltriethoxysilane—to mention but a few—alkylalkoxysiloxanes, for example propyl- or octyl-functional methoxy- or ethoxysiloxanes, as described, inter alia, in EP 0 814 110, EP 1 205 481 and EP 1 205 505, or silicones, waxes or oils can be used as hydrophobizing reagents. Metal oxides treated in this manner are designated as hydrophobized metal oxides in the context of the present invention.

The average particle size of hydrophobic metal oxides used according to the invention is advantageously 1 to 300 nm (including all numbers in between), preferably 2 to 150 nm, particularly preferably 3 to 100 nm, very particularly preferably 4 to 70 nm, in particular 5 to 50 nm. The average particle size can be determined, for example, by means of transmission electron microscopy (TEM).

The specific surface areas of hydrophobic metal oxides used according to the invention are advantageously 20 to 800 g/m² (including all numbers in between), preferably 25 to 600 g/m², particularly preferably 50 to 500 g/m², very particularly preferably 60 to 400 g/m², in particular 70 to 300 g/m². The specific surface area (BET) can be determined, for example, on the basis of DIN 66131.

Compositions according to the invention advantageously have a content of 0.01 to 10% by weight (including all numbers in between) of hydrophobic metal oxide, preferably 0.01 to 5% by weight, particularly preferably 0.05 to 4% by weight, in particular 0.1 to 2% by weight, based on the total mass of the composition.

The compositions according to the invention may be present and may be used as such, as a solution in an organic solvent, as an aqueous emulsion or as an aqueous solution. The formulations which can be used advantageously have a content of hydrophobizing active substance or hydrophobizing active substance mixture of 0.5 to 99.99% by weight (including all numbers in between), preferably 5 to 99.95% by weight, particularly preferably 8 to 99.9% by weight, very particularly preferably 10 to 75% by weight, based on the composition.

According to the invention, in particular alcohols, such as methanol, ethanol or isopropanol, polar aprotic solvents, such as acetone, DMSO or NMP, aliphatic or aromatic solvents, such as n-hexane, toluene or xylenes, or mineral oils, such as mineral spirit, may be used as organic solvents.

Thus, according to the invention, compositions can advantageously have a content of at least one organic solvent or diluent from the series consisting of the aliphatic and aromatic hydrocarbons having a boiling point above room temperature, preferably of the $C_6$- to $C_{12}$-alkanes, benzine, petroleum ether, diesel, kerosine, toluene, xylene, the alcohols or polyols, preferably methanol, ethanol, isopropanol, tert-butanol, pentanol, hexanol, octanol, nonanol, isononanol, glycerol, the ketones, preferably acetone, or a mixture of at least two of the abovementioned organic solvents or diluents.

If the composition according to the invention is present in the form of an aqueous emulsion, this may have a content of at least one emulsifier; the emulsifier can advantageously be selected from the series consisting of the alkylsulphates having $C_8$-$C_{18}$-alkyl, alkyl and alkaryl ether sulphates having $C_8$-$C_{18}$-alkyl in the hydrophobic radical and having 1 to 40 ethylene oxide (EO) or propylene oxide (PO) units, alkanesulphonates having $C_8$-$C_{18}$-alkyl, alkarylsulphonates having $C_8$-$C_{18}$-alkyl, monoesters of sulphosuccinic acid with monohydric alcohols or alkylphenols having 5 to 15 carbon atoms, alkali metal and ammonium salts of carboxylic acids having 8 to 20 carbon atoms in the alkyl, aryl, alkaryl or aralkyl radical, alkyl and alkaryl phosphates having 8 to 20 carbon atoms in the organic radical, alkyl ether or alkaryl ether phosphates having 8 to 20 carbon atoms in the alkyl or alkaryl radical and 1 to 40 EO units, alkylpolyglycol ethers and alkarylpolyglycol ethers having 8 to 40 EO units and $C_8$-$C_{20}$ carbon atoms in the alkyl or aryl radicals, ethylene oxide/propylene oxide (EO/PO) block copolymer having 8 to 40 EO and PO units, adducts of alkyl-amines having $C_8$-$C_{22}$-alkyl radicals with ethylene oxide or propylene oxide, alkylpolyglycosides having linear or branched saturated or unsaturated $C_8$-$C_{24}$-alkyl radicals and oligoglycoside radicals having 1 to 10 hexose or pentose units, silicon-functional surfactants or mixtures of these emulsifiers.

The content of emulsifier in a composition according to the invention is preferably 0.01 to 5% by weight, particularly preferably 0.05 to 4% by weight (including all numbers in between), based on the total weight of the emulsion.

Furthermore, compositions according to the invention may have a content of at least one hydrolysis or condensation catalyst from the series consisting of the complex compounds, such as halides, oxides, hydroxides, imides, alcoholates, amides, thiolates, carboxylates and/or combinations of these substituents, of elements of the 3rd and 4th main group of the Periodic Table of the Elements (PTE) and of subgroups II, III, IV, V, VI, VII and VIIIa, VIIIb and VIIIc of the PTE, in particular titanates or zirconates, such as, for example, tetra-n-butyl orthotitanate or tetra-n-propyl orthozirconate. In addition, oxides, hydroxides, hydrogen phosphates, hydrogen sulphates, sulphides, hydrogen sulphides, carbonates or bicarbonates of the 1st and 2nd main group of the PTE and/or alcoholates, preferably sodium methanolate or sodium ethanolate and/or aminoalcohols, preferably 2-aminoethanol or 2-(N,N-dimethyl)aminoethanol, may be present as the catalyst. In addition, carboxylic acids, such as formic acid, acetic acid or propionic acid, and mineral acids, such as hydrochloric acid or phosphoric acid, or a mixture of at least two of said catalysts may advantageously be used as the hydrolysis or condensation catalyst.

The hydrolysis or condensation catalysts mentioned can advantageously be used in an amount of 0.05 to 5% by weight (including all numbers in between), preferably 0.1 to 2% by weight, very particularly preferably 0.2 to 1.8% by weight, based on the amount of hydrophobizing active substance used.

In addition, a composition according to the invention can advantageously have a content of at least one further auxiliary, selected from the series consisting of inorganic or organic acids, buffer substances, fungicides, bactericides, algicides, microbicides, odorous substances, corrosion inhibitors, preservatives, rheology auxiliaries.

In addition, one or more non-hydrophobized metal oxides may also be added to compositions according to the invention as further auxiliary, in addition to one or more of the hydrolysis or condensation catalysts described, with the result that an even greater abrasion resistance and water repellent effect can advantageously be achieved.

The compositions according to the invention can be mixed by simple mixing of the individual components in a container with a suitable mixing unit. This mixing can be effected continuously, for example by using a mixing tube, or batchwise.

The preparation of an aqueous emulsion is described in detail from the technical point of view, for example in WO 06/081892 and WO 06/081891. Advantageously, a composition according to the invention comprising at least one hydrophobizing active substance and at least one hydrophobic metal oxide can be used as the oil phase. The abovementioned documents are therefore part of the present description in their entirety.

Thus, the compositions according to the invention can advantageously be prepared by metering said constituents in succession into a suitable container and homogenizing them by mixing.

The present invention therefore relates to a process for the preparation of a composition according to the invention by combining
  at least one hydrophobizing active substance and
  at least one hydrophobic metal oxide in a mixing unit and
    mixing them batchwise or continuously
  optionally with at least one hydrolysis or condensation catalyst,
  optionally water,
  optionally at least one organic solvent,
  optionally at least one emulsifier and
  optionally with at least one further auxiliary.

The present invention furthermore relates to a fluorine-free composition which is obtainable by the process according to the invention.

Finally, the present invention relates to the use of a fluorine-free composition according to the invention or of a composition prepared by the process according to the invention for hydrophobizing porous mineral substrates and for producing a water repellent effect on the substrate surface, in particular of building materials, such as concrete, fibre cement, clay, loam, brick, marble, plaster, substrates based on plaster or plaster-containing substrates, granite, sandstone or lime sandstone, one or more water drops which remain on the treated substrate surface over a time of 1 minute practically not wetting the surface, thus advantageously leaving behind no spots due to wetting which are detectable with the naked eye.

In particular, mineral substrates which have low nucleophilicity, i.e. as a rule those having a low content of free OH groups, cannot be made sufficiently water repellent by means customary to date. Such mineral substrates are, for example, calcium carbonate and magnesium carbonate or substrates based on calcium carbonate or magnesium carbonate, such as limestone, or calcium sulphate or magnesium sulphate or substrates based on calcium sulphate or magnesium sulphate, such as plaster, and are frequently used in the building industry. Surprisingly, compositions according to the invention are also particularly advantageous for producing hydrophobizing properties and water repellent effects on such substrates or corresponding materials, products, articles or components.

Another subject therefore comprises products which are treated with a composition according to the invention, in particular those based on concrete, plaster, lime sandstone, limestone.

The invention is illustrated in more detail with reference to the following examples, but without limiting the subject matter of the invention.

EXAMPLES

All data below in % by weight are based on the total mass of the prepared formulation.

Example 1

At room temperature, an alkyltrialkoxysilane (Protectosil® BHN from Evonik Degussa GmbH) was initially introduced into a clean, dry glass vessel and 0.5% by weight of the hydrophobic silica AEROSIL® R 202 (obtainable from Evonik Degussa GmbH) was added. The mixture formed was stirred for a further 5 minutes and could then be used directly.

Example 2

At room temperature, ethanol was initially introduced into a clean, dry glass vessel and 20% by weight of an alkyltrialkoxysilane (Protectosil® BHN from Evonik Degussa GmbH), 20% of an ethyl polysilicate (Dynasylan A from Evonik Degussa GmbH), 1.5% by weight of a catalyst (Tyzor TnBT from DuPont) and 0.5% by weight of the hydrophobic silica AEROSIL® R 202 (obtainable from Evonik Degussa GmbH) were added in succession. The mixture formed was stirrer for a further 5 minutes and could then be used directly.

Example 3

At room temperature, Shellsol D 60 (obtainable from Shell Chemicals) was initially introduced into a clean, dry glass vessel and 10% by weight of an alkylsiloxane (Protectosil® 266 from Evonik Degussa GmbH) and 1% by weight of the hydrophobic silica AEROSIL® R 972 (obtainable from Evonik Degussa GmbH) were added in succession. The mixture formed was stirred for a further 5 minutes and could then be used directly.

Example 4 (Comparative Example)

A pure alkyltrialkoxysilane (Protectosil® BHN from Evonik Degussa GmbH) was used.

Example 5 (Comparative Example)

At room temperature, 0.5% by weight of the hydrophobic silica AEROSIL® R 202 (obtainable from Evonik Degussa GmbH) was suspended in ethanol in a dry, clean glass vessel.

Example 6 (Comparative Example)

Analogous to Example 2, but without the addition of the hydrophobic silica AEROSIL® R 202.

Example 7 (Comparative Example)

At room temperature, an aqueous emulsion of an alkylsiloxane (Protectosil® WS 600 from Evonik Degussa GmbH) was initially introduced into a clean, dry glass vessel and 1% by weight of the hydrophilic silica AEROSIL® 200 (obtainable from Evonik Degussa GmbH) was added. The mixture formed was stirred for a further 5 minutes and could then be used directly.

Evaluation of the Examples

Table 1 below lists the results of the abovementioned examples. For this purpose, the ready-to-use solutions were applied to concrete panels and lime sandstone panels having the dimensions 15×7.5×1 cm in the amount stated in each case by immersion of the panels. For determining the quality of the water repellent properties, water drops were placed on top and, unless they had been absorbed after a contact time of 1 minute, the so-called contact angles were determined. (The measurement of the contact angle was effected according to DIN EN 828.) In addition, the drops were wiped off after a contact time of 10 minutes and the remaining surface was assessed (spot formation: 0=drops repelled, 1=no wetting, 2=contact surface half wetted, 3=contact surface completely wetted, 4=dark coloration of the contact surface, drops somewhat absorbed, 5=dark coloration of the contact surface, drops absorbed to an extent of 50%, 6=dark coloration of the contact surface, drops completely absorbed).

The hydrophobizing properties are expressed by the reduction of the water absorption of the individual mixtures. For this purpose, concrete, lime sandstone or plaster panels measuring 15×7.5 cm were treated with the stated amount by immersion. After a setting time of 2 weeks, the treated concrete and lime sandstone panels were stored completely under water for 24 hours. The weight increase was then determined. The reduction of the water absorption is obtained by comparison with an untreated cube.

Plaster test specimens (water/plaster value=0.5) were stored according to DIN EN 520 under water for 2 hours and the weight increase in % was then determined. The standard envisages a weight increase of <5% for the highest class.

TABLE 1

Results of Examples 1 to 7.

| Mixture from Example | Substrate | Amount applied [g/m$^2$] | Contact angle after 1 minute (static) | Spot formation after 10 minutes (Henkel test) | Reduction of the water absorption [%] |
|---|---|---|---|---|---|
| 1 | Concrete | 153 | 147° | 0 | 92.5 |
| 1 | Lime sandstone | 213.3 | 145° | * | 96.2 |
| 2 | Plaster | 210.3 | 145.5° | 2 | 0.54 *** |
| 3 | Concrete | 158 | 130° | 1-2 | 87.0 |

TABLE 1-continued

Results of Examples 1 to 7.

| Mixture from Example | Substrate | Amount applied [g/m²] | Contact angle after 1 minute (static) | Spot formation after 10 minutes (Henkel test) | Reduction of the water absorption [%] |
|---|---|---|---|---|---|
| 4 | Concrete | 160 | ** | 4 | 89 |
| 4 | Lime sandstone | 220 | ** | 3 | 90.5 |
| 5 | Concrete | 146 | 152° | * | 24.2 |
| 6 | Plaster | 250 | 111° | 2-3 | 0.7% *** |
| 7 | Concrete | 237 | 76° | 4 | 87.4% |

\* Drop comes back off the surface, test not possible
\*\* Complete wetting, not measurable
\*\*\* The water absorption for plaster is determined analogously to EN 520 as a weight increase. Untreated plaster shows a weight increase of >20%.
n.d.: not determined Conclusion Both on concrete and lime sandstone and on plaster, the compositions according to the invention show outstanding water repellent properties in combination with outstanding hydrophobizing effect (expressed as reduction of the water absorption or weight increase on storage under water).

Formulations which lack one of the components according to the invention show an increased water absorption and/or poorer water repellent properties.

The invention claimed is:

1. A fluorine-free composition, comprising:
    (A) a hydrophobizing active substance comprising a mixture of at least one alkyl-substituted silane of the general formula I, at least one a linear, cyclic or branched oligomeric siloxane of idealized formula II and at least one an alkyl silicate of idealized formula III:

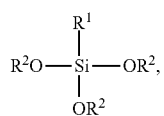

I

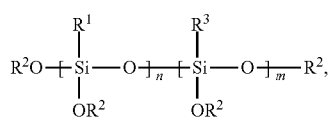

II

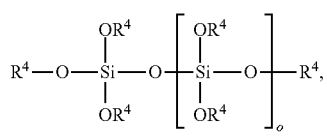

III wherein
    each $R^1$ independently represents a $C_1$-$C_{18}$-alkyl group;
    each $R^2$ independently represents a hydrogen atom or an alkyl radical having from 1 to 6 carbon atoms;
    each $R^3$ independently represents a $C_1$-$C_{18}$-alkyl group which may optionally comprise substituents having one or more heteroatoms selected from the group consisting of N, O, Cl, P and S;
    each $R^4$ independently represents a hydrogen atom or an alkyl radical having from 1 to 6 carbon atoms;
    (n+m) represents an average degree of oligomerization with a value of from 2 to 50, wherein the average molar mass of the linear, cyclic or branched oligomeric siloxane of idealized formula II is from 300 to 10 000 g/mol; and
    o is a number from 0 to 50; and
    (B) from 0.01 to 10% by weight of at least one hydrophobic metal oxide.

2. A composition according to claim 1, which comprises from 0.5 to 99.99% by weight of the hydrophobizing active substance.

3. A composition according to claim 1, further comprising at least one component selected from the group consisting of at least one hydrolysis or condensation catalyst, at least one organic solvent, water, at least one emulsifier and further auxiliaries.

4. A composition according to claim 3, wherein the composition comprises at least one organic solvent selected from the group consisting of an aliphatic hydrocarbon having a boiling point above room temperature, an aromatic hydrocarbon having a boiling point above room temperature, a polar aprotic solvent, an alcohol, a polyol, and a ketone.

5. A composition according to claim 3, wherein the composition comprises at least one hydrolysis or condensation catalyst selected from the group consisting of a complex compound of elements of the 3rd and 4th main group of the Periodic Table of the Elements (PTE) and of subgroups II, III, IV, V, VI, VII and VIIIa, VIIIb and VIIIc of the PTE, a salt of elements of the 1st and 2nd main group of the PTE, an alcoholate, an aminoalcohol, a carboxylic acid and a mineral acid.

6. A composition according to claim 5, wherein the complex compound of elements of the 3rd and 4th main group of the PTE is titanate or zirconate.

7. A composition according to claim 5, which comprises from 0.05 to 5% by weight of the catalyst content based on the amount of the hydrophobizing active substance.

8. A composition according to claim 3, which comprises at least one emulsifier selected from the group consisting of an alkylsulphate having $C_8$-$C_{18}$-alkyl, alkyl and alkaryl ether sulphate having $C_8$-$C_{18}$-alkyl in the hydrophobic radical and having from 1 to 40 ethylene oxide (EO), a $C_8$-$C_{18}$-alkyl, alkyl and alkaryl ether sulphate having $C_8$-$C_{18}$-alkyl in the hydrophobic radical and having from 1 to 40 propylene oxide (PO) units, an alkylsulphonate having $C_8$-$C_{18}$-alkyl, an alkarylsulphonate having $C_8$-$C_{18}$-alkyl, a monoester of sulphosuccinic acid with monohydric alcohols having from 5 to 15 carbon atoms, a monoester of sulphosuccinic acid with alkylphenols having from 5 to 15 carbon atoms, an alkali metal and ammonium salt of carboxylic acid having from 8 to 20 carbon atoms in the alkyl radical, an alkali metal and ammonium salt of carboxylic acid having from 8 to 20 carbon atoms in the aryl radical, an alkali metal and ammonium salt of carboxylic acid having from 8 to 20 carbon atoms in the alkaryl radical, an alkali metal and ammonium salt of carboxylic acid having from 8 to 20 carbon atoms in the aralkyl radical, an alkyl and alkaryl phosphate having from 8 to 20 carbon atoms in the organic radical, an alkyl ether phosphate having from 8 to 20 carbon atoms in the alkyl radical and from 1 to 40 EO units, an alkyl ether phosphate having from 8 to 20 carbon atoms in the alkaryl radical and from 1 to 40 EO units, an alkaryl ether phosphate having from 8 to 20 carbon atoms in the alkyl radical and from 1 to 40 EO units, an alkaryl ether phosphate having from 8 to 20 carbon atoms in the alkaryl radical and from 1 to 40 EO units, an alkylpolyglycol ether and an alkarylpolyglycol ether having from 8 to 40 EO units and $C_8$-$C_{20}$-carbon atoms in the alkyl radical, an alkylpolyglycol ether and an alkarylpolyglycol ether having from 8 to 40 EO units and $C_8$-$C_{20}$-carbon atoms in the aryl radical, an ethylene oxide/propylene oxide (EO/PO) block copolymer having from 8 to 40 EO and PO units, an adduct of alkylamine having $C_8$-$C_{22}$-alkyl radicals with ethylene oxide, an adduct of alkylamine having $C_8$-$C_{22}$-alkyl radicals with propylene oxide, an alkylpolyglycoside having linear $C_8$-$C_{24}$-alkyl radicals and an oligo-glycoside radical having from 1 to 10 hexose units, an alkylpolyglycoside having linear $C_8$-$C_{24}$-alkyl radicals and an oligoglycoside radical having from 1 to 10 pentose units, an alkylpolyglycoside having branched saturated $C_8$-$C_{24}$-alkyl radicals and an oligoglycoside radical having from 1 to 10 hexose units, an alkylpolyglycoside having branched saturated $C_8$-$C_{24}$-alkyl radicals and an oligoglycoside radical having from 1 to 10 pentose units, an alkylpolyglycoside having unsaturated $C_8$-$C_{24}$-alkyl radicals and an oligoglycoside radical having from 1 to 10 hexose units, an alkylpolyglycoside having unsaturated $C_8$-$C_{24}$-alkyl radicals and an oligoglycoside radical having from 1 to 10 pentose units, and a silicon-functional surfactant.

9. A composition according to claim 8, which comprises from 0.01 to 5% by weight of the emulsifier based on the total weight of the composition.

10. A composition according to claim 3, wherein the composition comprises at least one auxiliary selected from the group consisting of an inorganic or organic acid, a buffer substance, a fungicide, a bactericide, an algicide, a microbicide, an odorous substance, a corrosion inhibitor, a preservative, and a rheology auxiliary.

11. A composition according to claim 1, wherein the hydrophobic metal oxide comprises at least one oxide, hydroxide or hydrated oxide of aluminium, silicon or titanium.

12. A composition according to claim 1, wherein the hydrophobic metal oxide comprises a silica.

13. A composition according to claim 1, wherein the hydrophobic metal oxide has an average particle size of 1 to 300 nm.

14. A method of preparing a fluorine-free composition according to claim 1, comprising combining (A) and (B).

15. A process of hydrophobizing a porous mineral substrate comprising treating the porous mineral substrate with the composition of claim 1.

16. A process of producing a water repellent effect on a substrate surface comprising treating the substrate surface with the composition of claim 1, wherein after treatment one or more water drops which remain on the treated substrate surface over a time of 1 minute leave behind no spots due to wetting.

* * * * *